United States Patent
Santos Moraes et al.

(10) Patent No.: US 10,482,180 B2
(45) Date of Patent: Nov. 19, 2019

(54) GENERATING GROUND TRUTH FOR QUESTIONS BASED ON DATA FOUND IN STRUCTURED RESOURCES

(71) Applicant: International Business Machines Corporation, Armonk, NY (US)

(72) Inventors: Priscilla Santos Moraes, Pflugerville, TX (US); Kathryn V. Banks, Austin, TX (US); Dan G. Tecuci, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 15/816,089

(22) Filed: Nov. 17, 2017

(65) Prior Publication Data
US 2019/0155904 A1    May 23, 2019

(51) Int. Cl.
*G06F 17/27* (2006.01)
*G06F 17/24* (2006.01)
(Continued)

(52) U.S. Cl.
CPC ...... *G06F 17/2785* (2013.01); *G06F 16/3329* (2019.01); *G06F 16/3344* (2019.01); *G06F 17/248* (2013.01); *G06F 17/2765* (2013.01)

(58) Field of Classification Search
CPC ............... G06F 17/27; G06F 17/2725; G06F 17/30076; G06F 17/30286;
(Continued)

(56) References Cited

U.S. PATENT DOCUMENTS

| 6,338,034 B1 * | 1/2002 | Ishikawa | G06F 17/2745 704/9 |
| 8,990,202 B2 * | 3/2015 | Smith | G06F 17/2264 707/706 |

(Continued)

OTHER PUBLICATIONS

Chaudhri, Vinay, et al., "Question Generation from a Knowledge Base", Proc. Int'l. Conf. European Knowledge Acquisition Workshop, pp. 54-65 (2014).

(Continued)

*Primary Examiner* — Martin Lerner
(74) *Attorney, Agent, or Firm* — Diana R. Gerhardt; Jack V. Musgrove

(57) ABSTRACT

Ground truth for a cognitive system is generated from a structured resource such as a table by identifying a subject of the structured resource and field headers. Linguistic analysis is performed on a given header to establish an interrogative context, and a question is generated relating to the subject based on the interrogative context, including an implementation of one or more mathematical operators. The question is generated using a question template, and has a question phrase based on the interrogative context, an operator phrase based on the selected operator, and a keyword phrase based on the subject. An answer to the question is determined by carrying out a computation that applies the selected operator(s) to one or more of the data values, to form a question-and-answer pair that is added to the ground truth. A filtering step is preferably used to ensure that the question-and-answer pair is valid.

20 Claims, 6 Drawing Sheets

(51) Int. Cl.
*G06F 16/332* (2019.01)
*G06F 16/33* (2019.01)

(58) Field of Classification Search
CPC .......... G06F 17/30401; G06F 16/3329; G06F 17/2745; G06F 17/2785
USPC ................................. 704/1, 9; 707/736, 741
See application file for complete search history.

(56) References Cited

U.S. PATENT DOCUMENTS

| | | | | |
|---|---|---|---|---|
| 9,286,290 | B2* | 3/2016 | Allen | G06F 17/2785 |
| 9,330,084 | B1 | 5/2016 | Kadambi et al. | |
| 9,401,881 | B2 | 7/2016 | Isensee et al. | |
| 9,471,877 | B1* | 10/2016 | Diamanti | G06F 11/30 |
| 2007/0094285 | A1* | 4/2007 | Agichtein | G06F 17/30398 |
| 2009/0313205 | A1* | 12/2009 | Hino | G06F 17/2247 |
| | | | | 706/54 |
| 2013/0196305 | A1 | 8/2013 | Adir et al. | |
| 2014/0075278 | A1* | 3/2014 | Bornea | G06F 17/2745 |
| | | | | 715/212 |
| 2014/0244676 | A1* | 8/2014 | Byron | G06F 17/2745 |
| | | | | 707/758 |
| 2015/0169737 | A1* | 6/2015 | Byron | G06F 16/3329 |
| | | | | 707/758 |
| 2015/0309990 | A1* | 10/2015 | Allen | G06F 17/2785 |
| | | | | 704/9 |
| 2016/0078127 | A1 | 3/2016 | Bhat et al. | |
| 2016/0180242 | A1* | 6/2016 | Byron | G06N 99/005 |
| | | | | 706/11 |
| 2016/0299963 | A1* | 10/2016 | Bhat | G06F 16/3329 |
| 2016/0300139 | A1* | 10/2016 | Bhat | G06F 17/30654 |
| 2016/0343086 | A1* | 11/2016 | Mondal | G06F 17/2745 |
| 2017/0052950 | A1* | 2/2017 | Danielyan | G06F 17/2785 |
| 2017/0116172 | A1* | 4/2017 | Mungi | G06F 17/246 |
| 2017/0161261 | A1 | 6/2017 | Mungi et al. | |
| 2017/0169355 | A1* | 6/2017 | Boyer | G06F 17/2785 |
| 2017/0351677 | A1* | 12/2017 | Chaubal | G06F 16/345 |
| 2018/0203924 | A1* | 7/2018 | Agrawal | G06F 17/30696 |

OTHER PUBLICATIONS

Heilman, Michael, et al., "Question Generation via Overgenerating Transformations and Ranking", Language Technologies Institute, Carnegie Mellon University Technical Report CMU-LTI-09-013 (2009).

* cited by examiner

70

| | | Corn Production in the World (in thousands of pounds) | | | | |
|---|---|---|---|---|---|---|
| Year | Argentina | Brazil | China | France | Indonesia | U.S. |
| 2010 | 112,943 | 109,894 | 98,321 | 88,213 | 100,590 | 120,938 |
| 2011 | 111,489 | 109,988 | 100,894 | 87,394 | 99,837 | 119,893 |
| 2012 | 112,342 | 108,432 | 101,932 | 90,768 | 101,989 | 124,853 |
| 2013 | 113,489 | 107,849 | 100,733 | 90,991 | 103,941 | 128,892 |
| 2014 | 113,928 | 108,338 | 101,891 | 89,483 | 104,02 | 130,201 |

*FIG. 3*

GENERATING GROUND TRUTH FOR QUESTIONS BASED ON DATA FOUND IN STRUCTURED RESOURCES

BACKGROUND OF THE INVENTION

Field of the Invention

The present invention generally relates to natural language processing, and more particularly to a method of establishing ground truths for a cognitive system.

Description of the Related Art

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may enter a natural language query in an Internet search engine, and the search engine intelligence can provide a natural language response which the user can hopefully understand.

Different technologies can converge to provide resources for NLP, such as speech-to-text conversion (voice recognition). A user can say something to a computer system or cellphone, and the voice signal captured by the microphone is analyzed according to a particular human language or dialect to produce a text input or query in a computer-readable form. Text analysis is known in the art pertaining to NLP and typically uses a text annotator program to search text and analyze it relative to a defined set of tags. The text annotator can generate linguistic annotations within the document to tag concepts and entities that might be buried in the text. A cognitive system can then use a set of linguistic, statistical and machine-learning techniques to analyze the annotated text, and extract key business information such as person, location, organization, and particular objects (e.g., vehicles), or identify positive and negative sentiment.

A cognitive system (sometimes referred to as deep learning, deep thought, or deep question answering) is a form of artificial intelligence that uses machine learning and problem solving. Cognitive systems often employ neural networks although alternative designs exist. A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

Cognitive systems rely on ground truth to carry out their analyses. Ground truth is typically paired data, i.e., a sample input and a response, such as a question and an answer. Training data sets can be provided for ground truth, usually with subject matter experts weighing in on which training data is reliable. Curating high-quality ground truth is an important but difficult part of training a cognitive system. Existing approaches include using a brainstorming session to generate what the programmer thinks is representative training data, gamifying ground truth generation (by providing points/badges for creating x amount of ground truth), letting the users decide what kind of ground truth they will generate, or dictating what kind of ground truth the users will create, most likely by starting at low-accuracy components.

SUMMARY OF THE INVENTION

The present invention in at least one embodiment is generally directed to a method of generating ground truth for a cognitive system by receiving a structured resource having a set of data values, receiving a set of operators, identifying a subject of the structured resource and at least one field header of the structured resource, performing linguistic analysis on the field header to determine an interrogative context, generating at least one question relating to the subject based on the interrogative context wherein the question includes an implementation of a selected one of the operators, and determining an answer for the question to form a question-and-answer pair. The question can include a question phrase based on the interrogative context, an operator phrase based on the selected operator, and a keyword phrase based on the subject. The question can also be generated using a question template. In the illustrative embodiment the data values are numerical values and the operators are mathematical operators. The answer may be provided by carrying out a computation that applies the selected operator to one or more of the data values. A filtering step is preferably used to ensure that the question-and-answer pair is valid. The question-and-answer pair can be stored as part of the ground truth for the cognitive system, and that system can then be used to formulate a response to a natural language query.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

FIG. 3 is a corn production table used in an example of ground truth generation in accordance with one implementation of the present invention.

The use of the same reference symbols in different drawings indicates similar or identical items.

DESCRIPTION OF THE PREFERRED EMBODIMENT(S)

Figure 1:
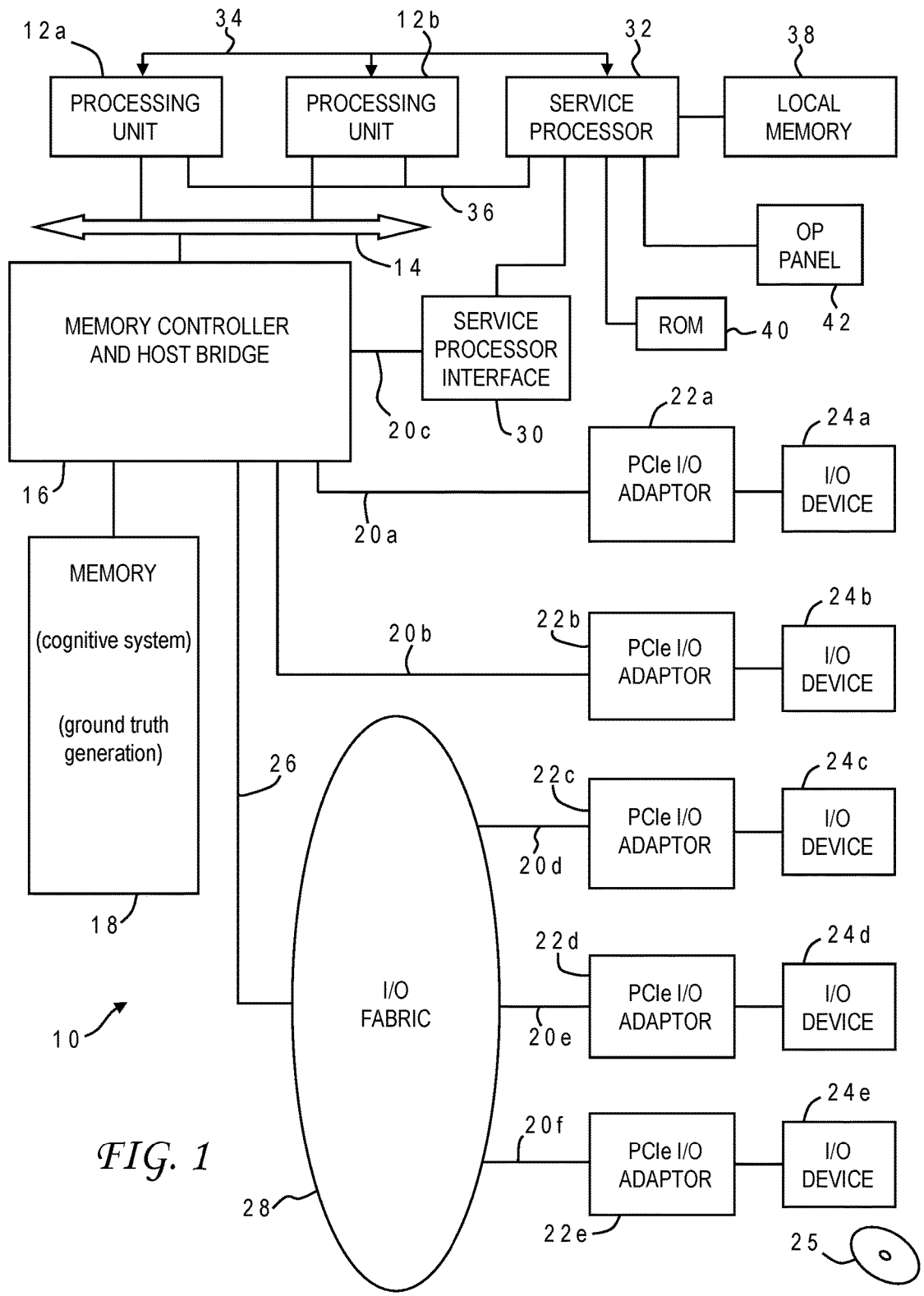
FIG. 1 is a block diagram of a computer system programmed to carry out ground truth generation in accordance with one implementation of the present invention.

Ground truth is an essential component of any learning system but often it is not readily available. Developing one that is sizable and complex enough can be an expensive and time consuming task. This problem is more acute when such ground truth requires domain knowledge to produce and validate. Such an example is that of answering questions that require computation (e.g., finding the maximum yearly increase in a sequence). Usually such ground truth is expressed as a pair consisting of the question along with the computation (expressed as a sequence of computation operators or a structured query) that generates the correct result. In order to generate such ground truth, knowledge of the raw data, its representation as well as computation operators is needed, previously making this the exclusive purview of subject matter experts (SMEs).

It would, therefore, be desirable to devise an improved method of generating ground truth for such questions, i.e., natural language questions that are rooted in one or more mathematical operations. It would be further advantageous if the method could extract such ground truth from data conveniently found in structured resources such as tables, spreadsheets or databases. The present invention in various implementations achieves these and other objectives and advantages by identifying features of the structured resource such as a subject and field headers, and performing linguistic analysis on the features to arrive at an interrogative context which can then be used to generate questions based on computations. Answers (most likely correct) can also be generated corresponding to those questions. The approach of the present invention is based on having access to a set of mathematical operators (e.g., on time-series data, computing the average, maximum, or the increase year to year), their type signatures (e.g., a maximum operation is a function taking in a sequence and mapping it to a number), an implementation of such mathematical operators (i.e., given a type-correct input they produce the desired output), and lexical knowledge about the operators (e.g., how they might surface in language). In addition, metadata about the data being queried can be used (e.g., types for entities of the structured resource).

A generate-and-prune methodology is preferably used in which a set of computation sequences are generated as possible functional compositions of mathematical operators based on type compatibility. They are applied to appropriate data sources (e.g., a table) and answers are computed through functional application of the operators' implementations. These answers are provably correct for the given computation (or at least as correct as the particular implementation allows). In parallel with the computation, for each computation sequence, an English question is generated based on: the lexical knowledge associated with the operators, their order of application, the metadata associated with the data on which the computation was carried out (e.g., the table title), and a question template. To make the question-and-answer (Q&A) pair a relevant data set, a filtering step can be applied to eliminate irrelevant questions as well as nonsensical ones. In addition, variations of the given questions might be elicited, for example, via crowd-sourcing. Specifically, non-SME's can be asked the following questions: whether the English formulation of the question makes sense (True/False), whether it makes sense for the given data source, how they would reformulate it (freetext). The present invention advantageously allows the generation of arbitrarily complex questions whose answers are not found in text, but need to be generated.

With reference now to the figures, and in particular with reference to FIG. 1, there is depicted one embodiment 10 of a computer system in which the present invention may be implemented to carry out the generation of ground truth for questions based on data found in structured resources. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more software programs such as a cognitive system application and a ground truth generation application in accordance with the present invention.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the ground truth generation application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a ground truth generation process that uses novel analytic techniques to enhance natural language processing (NLP). Accordingly, a program embodying the invention may additionally include conventional aspects of various NLP and cognitive system tools, and these details will become apparent to those skilled in the art upon reference to this disclosure.

Figure 2:
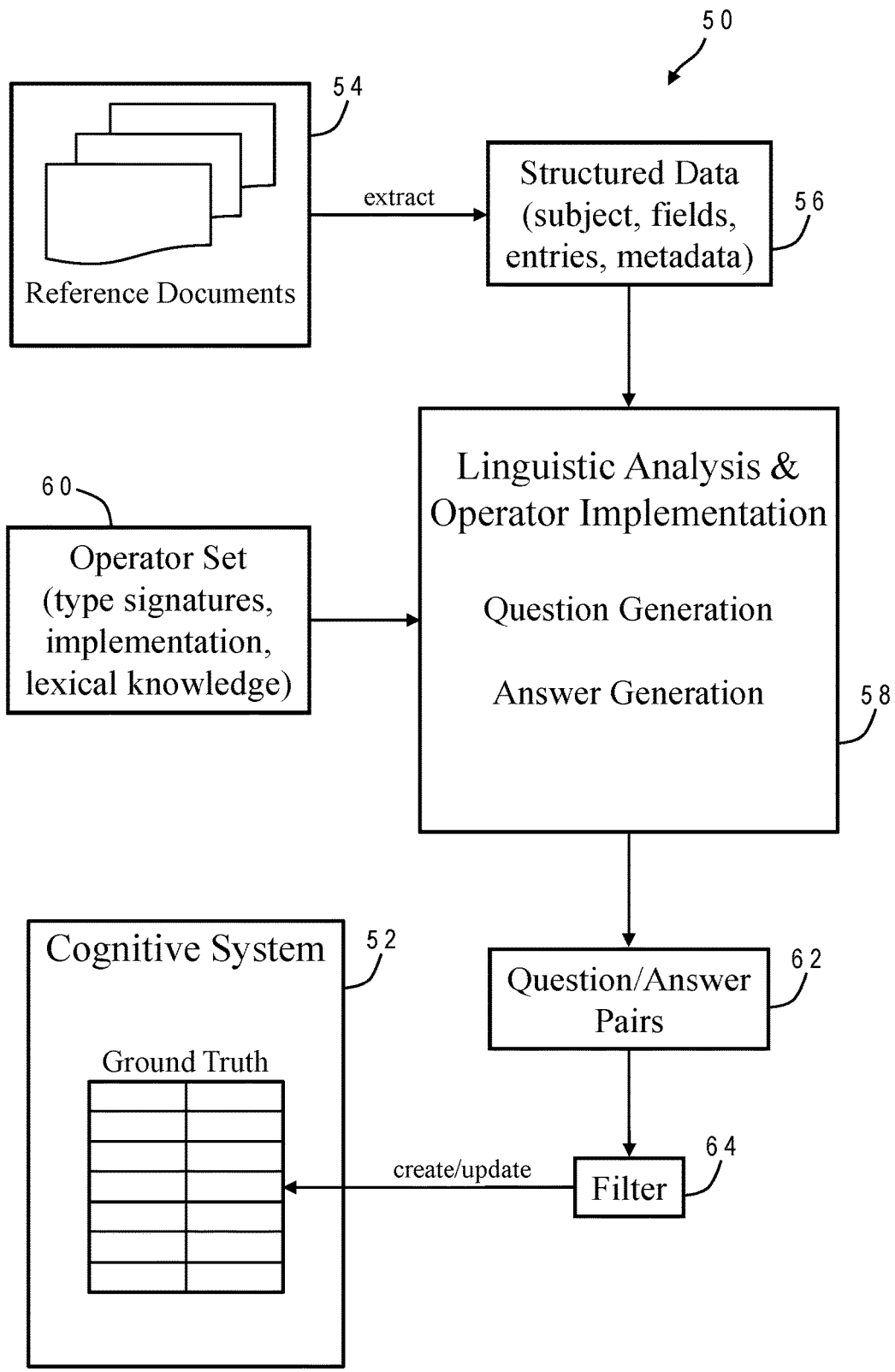
FIG. 2 is a high-level pictorial representation of ground truth generation for a cognitive system in accordance with one implementation of the present invention.

Referring now to FIG. 2, there is depicted a high-level pictorial representation of ground truth generation 50 for a cognitive system 52 in accordance with one implementation of the present invention. Cognitive system 52 may be implemented within computer system 10 or in other computer configurations as discussed above. One or more reference documents 54 are examined to extract structured data 56. Reference documents 54 may come from any convenient source, curated by subject matter experts or simply read from easily accessible electronic media such as the Internet. In particular reference documents 54 include one or more structured resources. The structured resources may be in any form in which there are different classes, fields, headers, etc., or other distinct groupings of associated data. The structured resources may include without limitation tables, spreadsheets, or databases, particularly relational databases. A document may be identified as structured by appropriate coding, e.g., HTML coding, or other format identifiers. Tables can also be extracted using automated visual identification, e.g., determining that data is present within a box having multiple rows and columns. For purposes of this implementation structured data 56 can be considered as being generated from a table having a general subject or topic (derived from metadata), one or more fields in the table (row and/or column headers), and multiple entries in a given field (an entry may be null). Examples of metadata used include: title and subtitle of the document on which the table appears; title of the chapter which contains the table, when applicable; paragraphs surrounding the table (immediate previous and next paragraphs usually carry some additional information about the content of the table); and legends and/or footnotes belonging to the table.

The collection of structured data 56 from a given document is input to a linguistic analysis module 58. Linguistic analysis module 58 may also reside in computer system 10, or in a separate computer system. Linguistic analysis module 58 uses a set of linguistic, statistical and machine-learning techniques to analyze text in the structured resources, and extract key information such as persons, locations, organizations, and particular objects (e.g., vehicles). In this manner linguistic analysis module 58 can identify the subject of the structured resource (e.g., an entity or concept from the title of a table), and the context of the fields (e.g., that all of the rows of a table pertain to a particular kind of numerical value). Linguistic analysis module 58 takes this identified structured data and applies it to one or more mathematical operators 60 (or combination of operators) to generate a question as discussed further below in conjunction with FIGS. 4A and 4B. Each operator in the set 60 of mathematical operators is provided with a type signature, an implementation, and lexical knowledge. For example, the operator may operate on time-series data, such as computing an "average value over time", a "maximum value over time", or an "increase over time" (e.g., year-to-year). The type signature generally identifies how the operator takes inputs and maps them to an output, such as a "maximum" operator taking in a sequence of numbers and generating a single number result. The implementation of a mathematical operator allows it to produce the specifically desired output as long as the input type is correct, i.e., it is the mathematical formula itself. Lexical knowledge about the operator provides information on how it might surface in language.

The number and types of mathematical operators is essentially unlimited, but subject to the designer's preferences and may be more focused depending upon the type of ground truth desired. The illustrative system uses the spreadsheet math operations in the Appendix as a reference. This list of operations is exemplary and should not be construed in a limiting sense. For example, the operators could be trigonometric. Combinations of operators are also permissible. The combination may be simple, involving only two operators, for example, "Minimum(Average)", i.e., a minimum value from among a plurality of average values computed based on entries in a given row. In a more complicated example, there may be a very large range of average quantities, so a logarithmic scale might be appropriate, resulting in an operator combination of "Log(Maximum(Average))". Each of these operators and operator combinations can be used to generate a natural language question. The question may also be a concatenation of two operations.

For each question so generated by the linguistic analysis, an answer is computed through functional application of the corresponding operator's implementation. Using the "Minimum(Average)" operator combination from the preceding paragraph, that operation can add together all entries in a given row and divide that sum by the number of entries (columns), yielding a plurality of average values for each row, and then select the average value that is the lowest. The answer to a given question can objectively be determined as correct or incorrect. Multiple question/answer pairs can be generated from a single structured resource using the same field or by considering different fields.

This linguistic analysis can be repeated for each structured resource in the reference documents 54 to yield a candidate set of question/answer pairs 62. In the implementation of FIG. 2 a generate-and-prune approach is used in which a large number of question/answer pairs 62 are created which may or may not be considered valid, i.e., the generated question may not be valid or the proposed answer may be incorrect. The validity of a question can be judged in different terms. For example, a question may technically be grammatically correct but it may be irrelevant or non-sensical. It may also seem overly redundant given other question/answer pairs (i.e., adding little substance to the ground truth). A filter 64 can accordingly be used to prune any unsuitable question/answer pairs. Filtering of questions may be performed in various manners, particularly automated or manual. One approach to automated prediction of question acceptability that may be used is disclosed in the paper "Question Generation via Overgenerating Transformations and Ranking", by Michael Heilman and Noah A. Smith. A preferred manual filtering method is crowdsourcing. Crowdsourcing refers to an internet marketplace that allows both individuals and companies to take part in a shared effort. Crowdsourcing users can be non-SME's who are asked a variety of inquiries, such as whether a generated question makes sense (true/false), or whether it makes sense for the given data source (table, etc.). Crowdsourcing can further improve upon the overall concept of question-and-answer (ground truth) generation by eliciting variations of the given question, i.e., how they would reformulate it (freetext). Once appropriately filtered and enhanced, the question/answer pairs can be used to create or update a ground truth for cognitive system 52.

FIG. 3 shows a table (structured resource) which can be used as an example in understanding how the present invention generates ground truth questions as well as computes answers to those questions in accordance with one implementation. This table represents annual corn production from six different countries for the years 2010 through 2014. The linguistic analysis performed on this table will detect that the title is "Corn Production in the World", the row headers are [2010, 2011, 2012, 2013, 2014], and the column headers are [Argentina, Brazil, China, France, Indonesia, United States]. Semantic and syntactic linguistic annotations are carried on this table data. For the title, "Corn Production in the World", the linguistic analysis will indicate that "Production" is the focus of the phrase, "Corn" is a noun adjunct and therefore probably important, and "in the World" is a prepositional adjunct and therefore probably not as important. The linguistic analysis performed on the row headers will indicate that each header is not simply a number but rather corresponds to a particular year, and therefore carries temporal significance, which means that questions whose answer relates to a row header or headers should start with an appropriate natural language term for an interrogative relating to time, e.g., the standalone wh-word "when" or a phrase "What/Which year". The linguistic analysis performed on the column headers will indicate that each header is a country (location or region), which means that questions whose answer relates to a column header or headers should begin with an appropriate natural language term for an interrogative relating to place, e.g., the standalone wh-word "where" or colloquially "who" or a phrase "What/Which country" or "What/Which location".

Figure 4A:
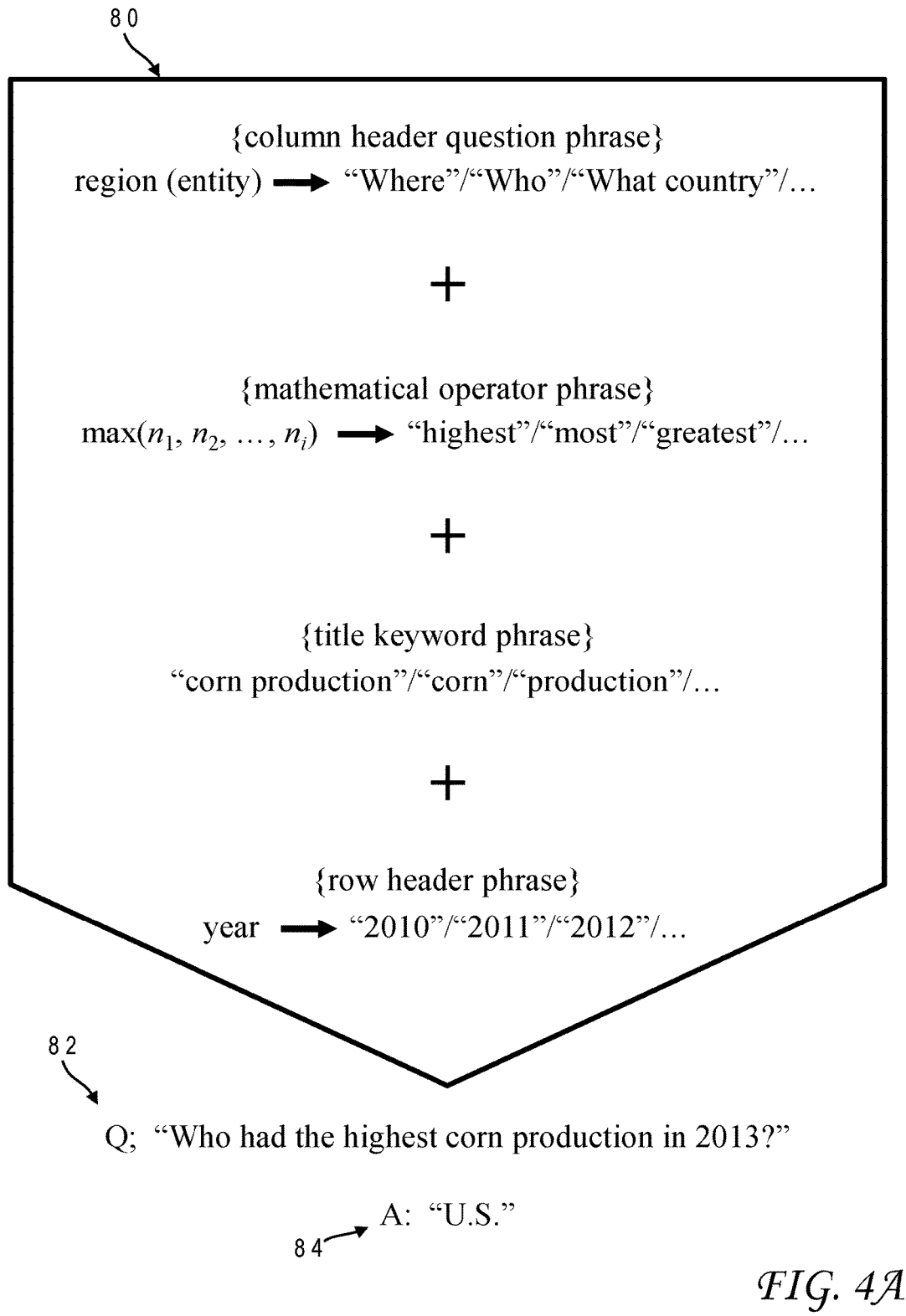
FIGS. 4A and 4B are pictorial representations of an analysis of the table of FIG. 3 in conjunction with two math operators and two resulting questions/answers in accordance with one implementation of the present invention.
Figure 4B:
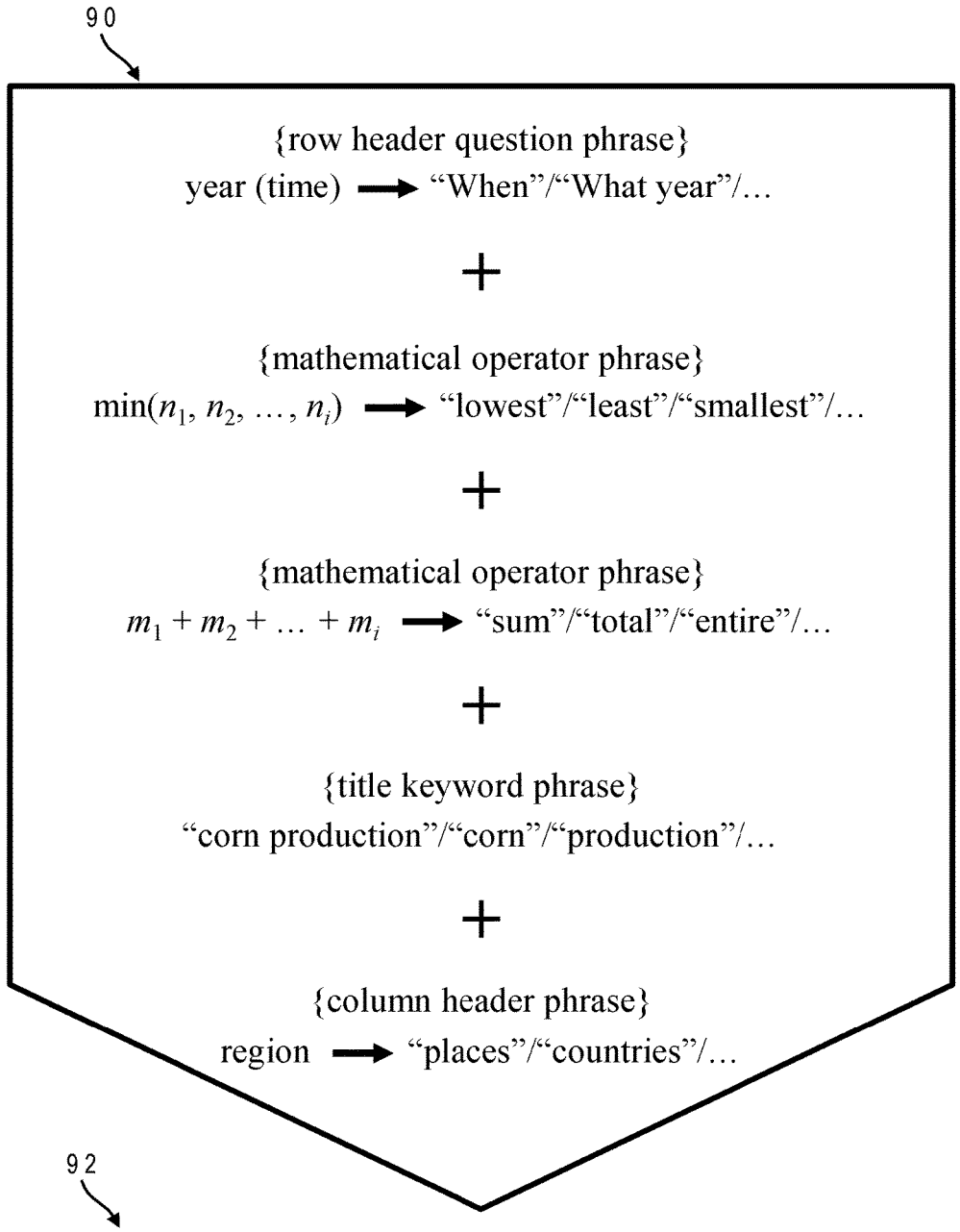

Questions can then be automatically generated using this information paired with one or more mathematical operators. FIGS. 4A and 4B are pictorial representations for the generation of two questions based on the foregoing linguistic analysis of the table of FIG. 3 in accordance with one implementation of the present invention. A column header question is to be generated in FIG. 4A according to a first question template 80. As noted above, this means that the question should begin with an interrogative such as "Who". The question generation logic selects a "Maximum" operator for this question, so the mathematical operator phrase becomes "highest". From the title, a keyword phrase is selected as "corn production". From the row headers, a row header phrase is selected as "2013". The NLP logic of the linguistic analysis puts these terms together in this order to generate the question 82: "Who had the highest corn production in 2013?". The answer generation logic uses the "Maximum" operator applied to the numeric values in the "2013" row to determine that the highest value for that row is 128,892, corresponding to the "U.S." column. The resulting answer 84 is thus "U.S.".

A row header question is to be generated in FIG. 4B according to a second question template 90. As noted above, this means that the question should begin with an interrogative such as "What year". The question generation logic selects a combination of a "Minimum" operator and a "Sum" operator for this question, so the mathematical operator phrase will include "lowest" and "total". From the title, the keyword phrase "corn production" is again selected. From the column headers, a column header phrase is selected as "countries". The NLP logic of the linguistic analysis puts these terms together in this order to generate the question 92: "What year had the lowest total corn production among all countries?". The answer generation logic first uses the "Sum" operator applied to the numeric values in each row to determine the following total annual production values from all six countries: 630,899 in 2010; 629,495 in 2011; 640,316 in 2012; 645,895 in 2013; and 647,861 in 2014. The answer generation logic then uses the "Minimum" operator applied to these row sums to determine that the lowest sum is 629,495. It should be noted that this minimum value does not itself appear as any entry in the table of FIG. 3. That lowest sum corresponds to the "2011" row, so the resulting answer 94 is "2011".

The two examples of FIGS. 4A and 4B are high-quality candidates just for purposes of illustration. It is understood that the NLP logic generating the questions may result in many candidates that are not proper questions or otherwise very poor quality and will be removed by the filtering process.

Figure 5:
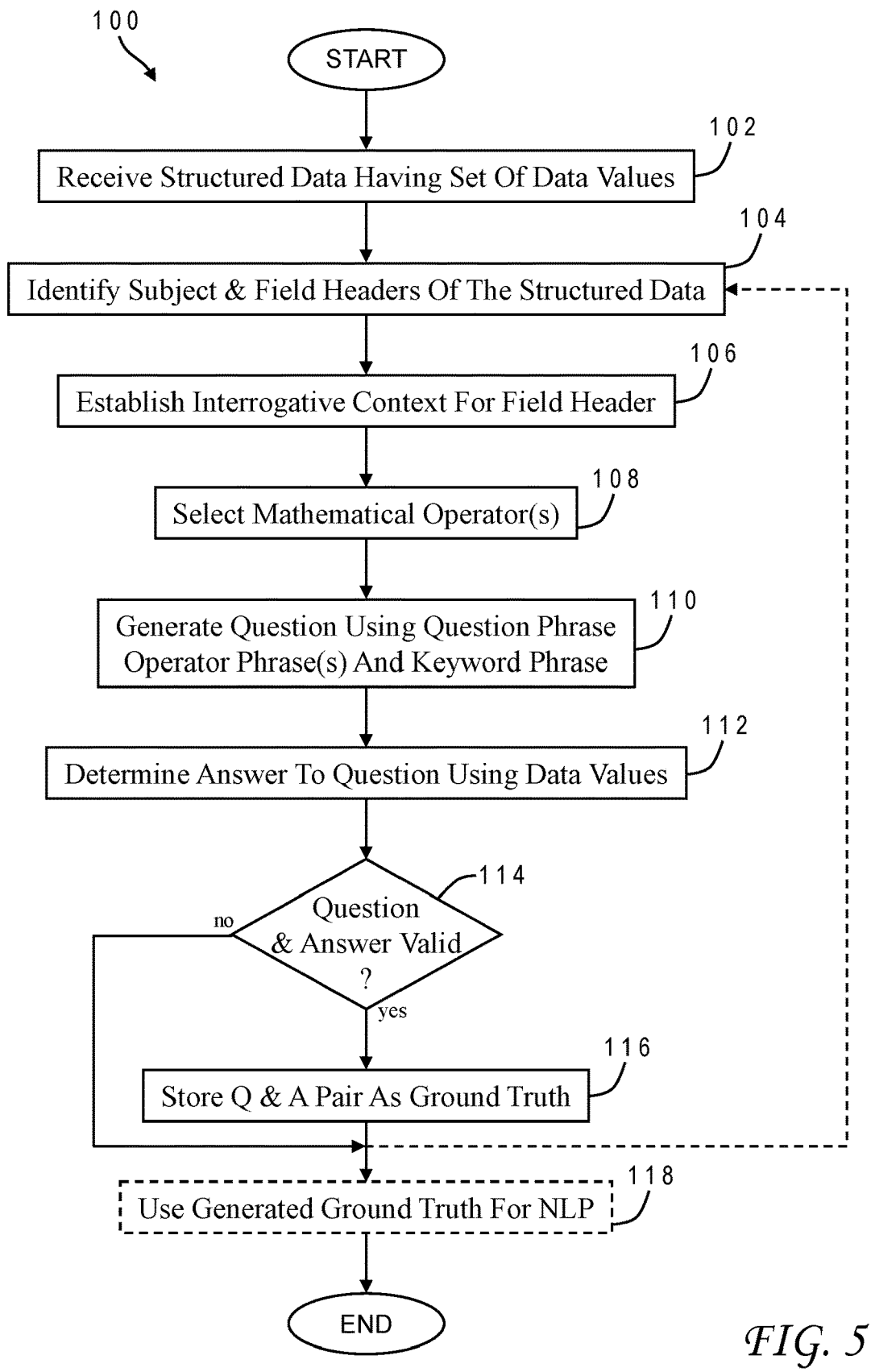
FIG. 5 is a chart illustrating the logical flow for a ground truth generation process in accordance with one implementation of the present invention.

The present invention may be further understood with reference to the chart of FIG. 5 which illustrates the logical flow for a ground truth generation process 100 in accordance with one implementation of the present invention. Process 100 begins with computer system 10 receiving the structured data with various sets of values or entries (102). NLP techniques are used to identify a subject and field headers of the structured data (104). Linguistic analysis is used to establish an interrogative context for a particular field header (106). One or more mathematical operators are selected for implementation with the structured data (108). A candidate question is generated using a question phrase based on the interrogative context and one or more operator phrases based on the operator(s), along with a keyword phrase based on the subject (110). The question can conform to a predetermined question template. An answer to the candidate question is then computed by applying the mathematical operator(s) to the appropriate data entries (112). The proposed question-and-answer pair is checked for validity (114) and if found valid is stored as ground truth (116). The entire process up to box 116 can be repeated for other structured resources to build up the ground truth. This ground truth may ultimately be used by a cognitive system to carry out natural language processing (118), e.g., provide a response to a natural language query involving some structured resource.

The present invention thereby provides a superior method of generating ground truth from structured resources without having to manually predefine any set of patterns, and leverages the structure/hierarchy of the fields in the table and the semantic role of the terms found in the table in order to construct the questions. Importantly, it enables the cognitive system to find a numerical answer to a query by applying mathematical operations embedded in the ground truth to numerical data found in a new structured resource. Such answers need not even be present themselves in the table cells. The use of crowdsourcing to augment the quality of the ground truth yields a diverse set of questions which remain relevant and linked to validated gold-standard answers.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the method described herein can be applied to any tabular content which is present in unstructured documents. It is therefore contemplated that such modifications can be made without departing from the spirit or scope of the present invention as defined in the appended claims.

APPENDIX—EXEMPLARY MATHEMATICAL OPERATORS

Basic Numeric Information:
ABS—Returns the absolute value (i.e. the modulus) of a supplied number
SIGN—Returns the sign (+1, −1 or 0) of a supplied number
GCD—Returns the Greatest Common Divisor of two or more supplied numbers
LCM—Returns the Least Common Multiple of two or more supplied numbers
Basic Mathematical Operations:
SUM—Returns the sum of a supplied list of numbers
PRODUCT—Returns the product of a supplied list of numbers
SQRT—Returns the positive square root of a given number
QUOTIENT—Returns the integer portion of a division between two supplied numbers
MOD—Returns the remainder from a division between two supplied numbers
AGGREGATE—Performs a specified calculation (e.g. the sum, product, average, etc.) for a list
SUBTOTAL—Performs a specified calculation (e.g. the sum, product, average, etc.) for a supplied set of values
Rounding Functions:
CEILING—Rounds a number away from zero (i.e. rounds a positive number up and a negative number down), to a multiple of significance
CEILING.PRECISE—Rounds a number up, regardless of the sign of the number, to a multiple of significance
ISO.CEILING—Rounds a number up, regardless of the sign of the number, to a multiple of significance
CEILING.MATH—Rounds a number up to the nearest integer or to the nearest multiple of significance
EVEN—Rounds a number away from zero (i.e. rounds a positive number up and a negative number down), to the next even number
FLOOR—Rounds a number towards zero, (i.e. rounds a positive number down and a negative number up), to a multiple of significance
FLOOR.PRECISE—Rounds a number down, regardless of the sign of the number, to a multiple of significance
FLOOR.MATH—Rounds a number down, to the nearest integer or to the nearest multiple of significance
INT—Rounds a number down to the next integer
MROUND—Rounds a number up or down, to the nearest multiple of significance
ODD—Rounds a number away from zero (i.e. rounds a positive number up and a negative number down), to the next odd number
ROUND—Rounds a number up or down, to a given number of digits
ROUNDDOWN—Rounds a number towards zero, (i.e. rounds a positive number down and a negative number up), to a given number of digits
ROUNDUP—Rounds a number away from zero (i.e. rounds a positive number up and a negative number down), to a given number of digits
TRUNC—Truncates a number towards zero (i.e. rounds a positive number down and a negative number up), to the next integer.
Matrix Functions:
MINVERSE—Returns the matrix inverse of a supplied array
MMULT—Returns the matrix product of two supplied arrays
MUNIT—Returns the unit matrix for a specified dimension
Random Numbers:
RAND—Returns a random number between 0 and 1
RANDBETWEEN—Returns a random number between two given integers
Conditional Sums:
SUMIF—Adds the cells in a supplied range, that satisfy a given criteria
SUMIFS—Adds the cells in a supplied range, that satisfy multiple criteria
Advanced Mathematical Operations:
SUMPRODUCT—Returns the sum of the products of corresponding values in two or more supplied arrays
SUMSQ—Returns the sum of the squares of a supplied list of numbers
SUMX2MY2—Returns the sum of the difference of squares of corresponding values in two supplied arrays
SUMX2PY2—Returns the sum of the sum of squares of corresponding values in two supplied arrays
SUMXMY2—Returns the sum of squares of differences of corresponding values in two supplied arrays
SERIESSUM—Returns the sum of a power series
Exponents & Logarithms: EXP—Returns e raised to a given power
LN—Returns the natural logarithm of a given number
LOG—Returns the logarithm of a given number, to a specified base
LOG10—Returns the base 10 logarithm of a given number
Factorials:
FACT—Returns the Factorial of a given number
FACTDOUBLE—Returns the Double Factorial of a given number
MULTINOMIAL—Returns the Multinomial of a given set of numbers

What is claimed is:
1. A method of providing ground truth for a cognitive system comprising:
receiving a structured resource having a set of data values, by executing first instructions in a computer system;

receiving a set of operators, by executing second instructions in the computer system;

identifying a subject of the structured resource and at least one field header of the structured resource, by executing third instructions in the computer system;

performing linguistic analysis on the field header to determine an interrogative context, by executing fourth instructions in the computer system;

generating at least one question relating to the subject based on the interrogative context wherein the question includes an implementation of a selected one of the operators, by executing fifth instructions in the computer system; and determining an answer for the question to form a question-and-answer pair.

2. The method of claim 1 wherein the question includes a question phrase based on the interrogative context, an operator phrase based on the selected operator, and a keyword phrase based on the subject.

3. The method of claim 1 wherein the data values are numerical values and the operators are mathematical operators.

4. The method of claim 1 wherein the question is generated using a question template.

5. The method of claim 1 wherein said determining the answer includes carrying out a computation by applying the selected operator to one or more of the data values.

6. The method of claim 1 further comprising determining that the question-and-answer pair is valid.

7. The method of claim 1 further comprising:

storing the question-and-answer pair as part of the ground truth for the cognitive system; and using the cognitive system to formulate a response to a natural language query.

8. A computer system comprising:

one or more processors which process program instructions;

a memory device connected to said one or more processors; and program instructions residing in said memory device for providing ground truth to a cognitive system by receiving a structured resource having a set of data values, receiving a set of operators, identifying a subject of the structured resource and at least one field header of the structured resource, performing linguistic analysis on the field header to determine an interrogative context, generating at least one question relating to the subject based on the interrogative context wherein the question includes an implementation of a selected one of the operators, and determining an answer for the question to form a question-and-answer pair.

9. The computer system of claim 8 wherein the question includes a question phrase based on the interrogative context, an operator phrase based on the selected operator, and a keyword phrase based on the subject.

10. The computer system of claim 8 wherein the data values are numerical values and the operators are mathematical operators.

11. The computer system of claim 8 wherein the question is generated using a question template.

12. The computer system of claim 8 wherein determining the answer includes carrying out a computation by applying the selected operator to one or more of the data values.

13. The computer system of claim 8 wherein said program instructions further determine that the question-and-answer pair is valid.

14. The computer system of claim 8 wherein said program instructions further store the question-and-answer pair as part of the ground truth for the cognitive system.

15. A computer program product comprising:

a computer readable storage medium; and program instructions residing in said storage medium for providing ground truth to a cognitive system by receiving a structured resource having a set of data values, receiving a set of operators, identifying a subject of the structured resource and at least one field header of the structured resource, performing linguistic analysis on the field header to determine an interrogative context, generating at least one question relating to the subject based on the interrogative context wherein the question includes an implementation of a selected one of the operators, and determining an answer for the question to form a question-and-answer pair.

16. The computer program product of claim 15 wherein the question includes a question phrase based on the interrogative context, an operator phrase based on the selected operator, and a keyword phrase based on the subject.

17. The computer program product of claim 15 wherein the data values are numerical values and the operators are mathematical operators.

18. The computer program product of claim 15 wherein the question is generated using a question template.

19. The computer program product of claim 15 wherein determining the answer includes carrying out a computation by applying the selected operator to one or more of the data values.

20. The computer program product of claim 15 wherein said program instructions further determine that the question-and-answer pair is valid.

* * * * *